United States Patent

Carassale

[19]

[11] Patent Number: 5,989,005
[45] Date of Patent: Nov. 23, 1999

[54] DEVICE WITH MODULAR STRUCTURES FOR APPLYING RELIEF IMPRESSIONS ONTO FOOD PASTES AND SIMILAR PRODUCTS

[75] Inventor: Fabio Carassale, Via Montelanico, 10 - 00177 Rome, Italy

[73] Assignee: Fabio Carassale, Rome, Italy

[21] Appl. No.: 08/894,006

[22] PCT Filed: Oct. 9, 1996

[86] PCT No.: PCT/IT96/00188

§ 371 Date: Aug. 11, 1997

§ 102(e) Date: Aug. 11, 1997

[87] PCT Pub. No.: WO97/24932

PCT Pub. Date: Jul. 17, 1997

[30] Foreign Application Priority Data

Jan. 5, 1996 [IT] Italy .................................. RM96A0009

[51] Int. Cl.[6] .................................................. A21C 11/02
[52] U.S. Cl. ......................................... 425/194; 425/363
[58] Field of Search .................................... 425/363, 373, 425/374, 385, 183, 193, 194; 426/512, 518; 249/103, 104; 264/284

[56] References Cited

U.S. PATENT DOCUMENTS 3,080,831   3/1963   Paitchell et al. .
3,937,852   2/1976   Wolf ......................................... 425/560
4,818,207   4/1989   Heron ....................................... 249/103
5,024,719   6/1991   Heck et al. .............................. 425/385
5,057,000  10/1991   Mangone, Jr. ........................... 249/104
5,198,242   3/1993   Groeblacher et al. .................. 425/385
5,303,473   4/1994   Sadler ...................................... 425/299
5,409,363   4/1995   Muldoon ............................. 425/348 R
5,421,670   6/1995   Meirick ................................... 425/385

FOREIGN PATENT DOCUMENTS 3727596   3/1989   Germany .
463697   4/1937   United Kingdom .

*Primary Examiner*—James P. Mackey
*Attorney, Agent, or Firm*—Smith, Gambrell & Russell, LLP; Beveridge, DeGrandi, Weilacher & Young Intellectual Property Group

[57] ABSTRACT

The device with modular structures for the relief impression or cuts onto food pastes and similar, comprises a plurality of separate parts, of the kind of half-bands, or full-coating structures, like jackets, prerferably cut, and that may be replaced and assembled for setting up again the diameter of the cylinder of the shaping group of a the machine working the paste, or even for realizing cylinders of dimensions different from the original one, for realizing "raviolis" or different products, of differentiated dimensions.

3 Claims, 2 Drawing Sheets

DEVICE WITH MODULAR STRUCTURES FOR APPLYING RELIEF IMPRESSIONS ONTO FOOD PASTES AND SIMILAR PRODUCTS

BACKGROUND AND SUMMARY OF THE INVENTION

The present invention concerns a device with modular structures for applying relief impressions or cuts onto food pastes and similar materials that may be applied in all production sectors, making use of gauge rollers with fixed or adjustable thicknesses.

It is the aim of the present invention to produce a relief or a cut shape onto a product being worked in machines for the preparation of "ravioli", pastes without filling, pastry products, or other similar products.

The aim set forth is reached by means of the device according to the present invention, comprising a plurality of separate parts, of the kind of half-bands, or full-coating structures, like jackets, preferably cut, that may be replaced and assembled for setting up again the diameter of the cylinder of the shaping group of the machine working the paste, or even for realizing cylinders of dimensions different from the original one, for use with "raviolis" or different products, of differentiated dimensions.

Such variations may be obtained, according to the present invention, by varying the diameter of the cylinder according to the dimension of the "ravioli" or other similar product, maintaining unvaried the dimensions inside the cylinder, and working only with supporting thicknesses and prolonging the blocking pins below the half-bands or below the full-coating structure or jacket.

The realization of the device according to the present invention may be applied onto all already existing machines and onto those still to be realized, varying the dimensions according to the available spaces and to the specific kind of machine.

The advantages deriving from the device according to the present invention may be described as follows:

- by means of impression, each producer, even an artisan, may personalize his own production by applying a mark;
- in the field of fresh pastes, a relief or cut realization onto the final product is made possible, operating onto the thickness or the image as in a bas-relief.

BRIEF DESCRIPTION OF THE DRAWINGS

The present invention will be described in more detail hereinbelow, in conjunction with the enclosed drawings in which some embodiments are shown. The drawings include:

FIGS. 4, 5, and 6, respectively, show a lateral schematic view, a detailed view of one portion of the device, and a front view of a variant of the device according to the present invention, for producing relief or cut impressions onto unfilled food pastes.

DETAILED DESCRIPTION OF THE INVENTION

Figure 1A:
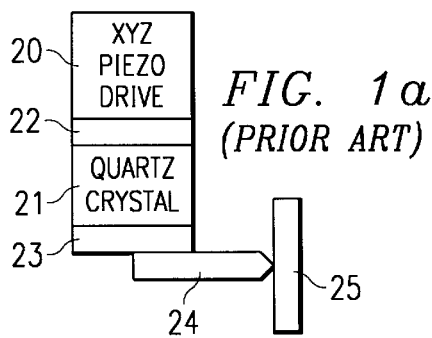
FIG. 1, which shows a lateral schematic view of a device with modular structures for producing relief impressions on food pastes and similar products, like filled "raviolis"
Figure 1B:
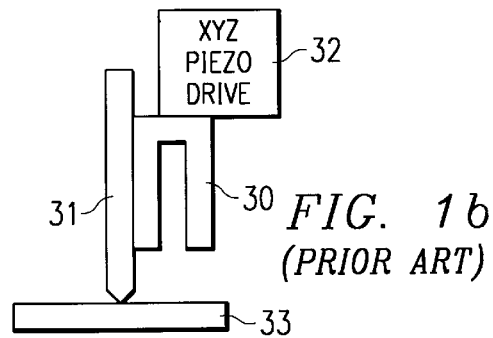
Figure 2A:
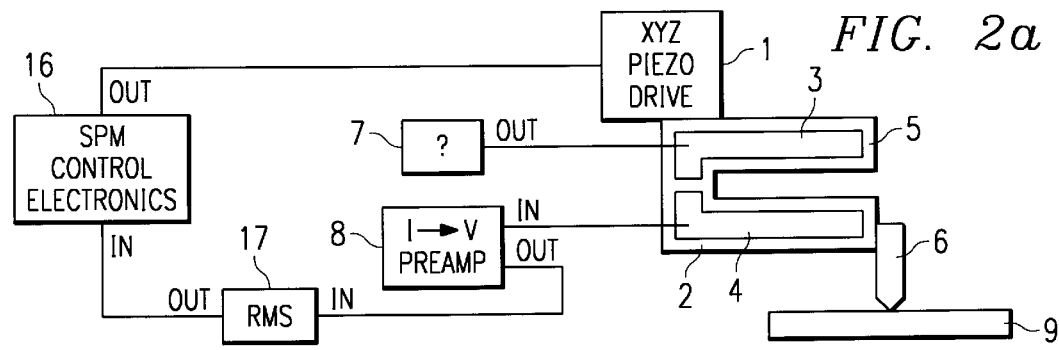
FIG. 2 shows an exploded view of the elements of the device according to the present invention.
Figure 2B:
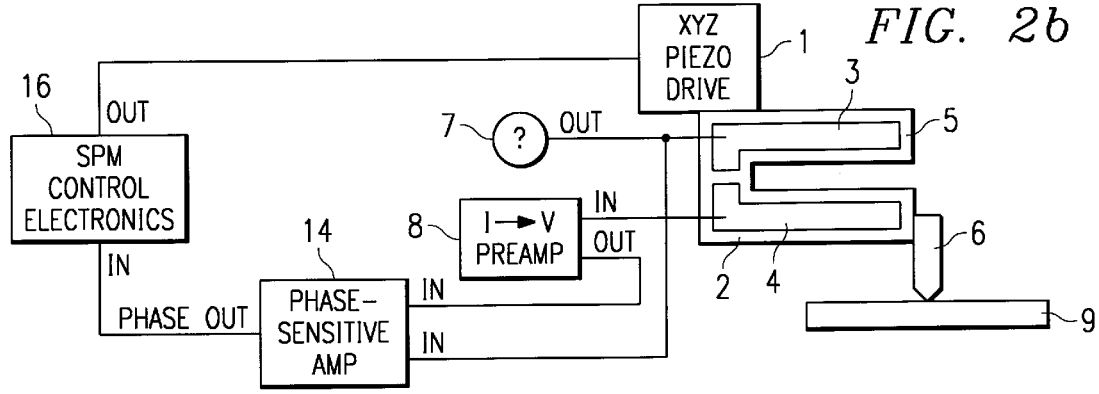
Figure 2C:
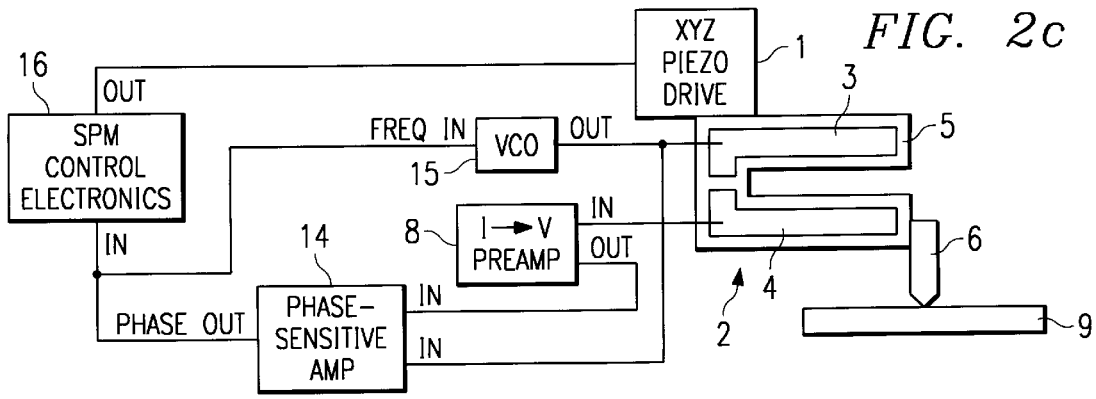
Figures 3A, 3B, 3C:
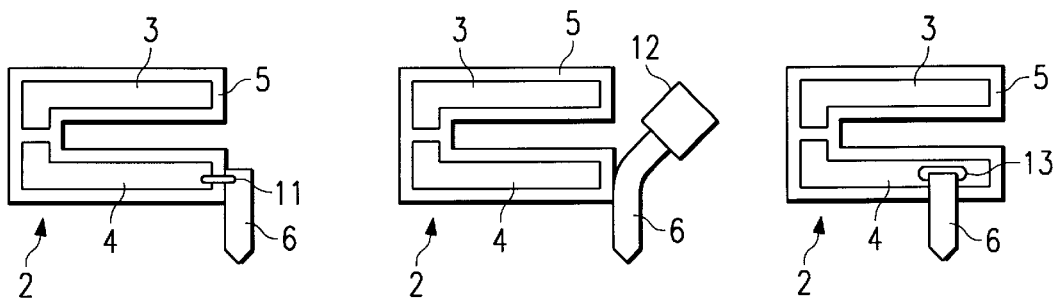
FIG. 3 shows an external and internal view of the flange.
Figure 4:
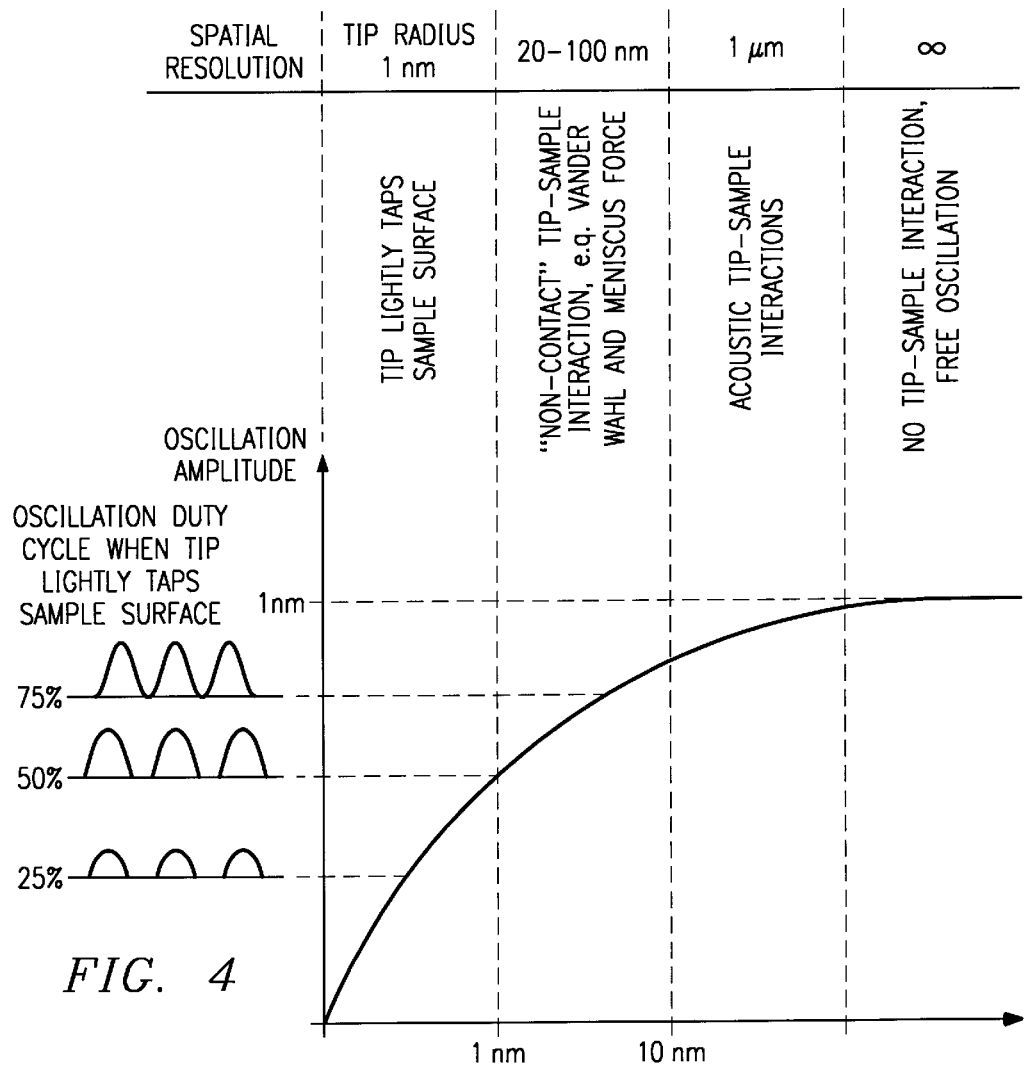

The enclosed figures show a device with modular structures for producing relief impressions on food pastes and similar products, comprising a flange 1, provided inside with seats 14 for a bushing 10 and with a seat for a washer 12 and for a screw bolt or screw 13, or alternatively with gears 11 having two cogged wheels or pairs with endless screw-helical wheels. In the case of composed external and internal flanges, according to the number of the half-bands, a plurality of locking points 15 for the internal part of the flange are obtained. The invention also includes one or more half-bands 2, and under-band pins 3 that are rounded for facilitating their inlet and outlet into screwings 17 of a slide 7. The under-band pins 3 are provided, in their upper part, with a washer 4, flat in its lower part and curved in its upper part, for adhering to the under-band, without intermediate threading, so as to prevent weakening of the pins 3 following to the continuous end-run, with respective out of center of the couplings. In a possible variant of the invention, a recess may be formed in the under-band insert, instead of using the washer 4, and a carrying plate linked to a locking pin, all fixed to the under-band pin.

The invention further includes a small carter 5 for protection against dust, having a plurality of eyelets 16 for the passage of the pins 3 during locking and unlocking of the halfbands to the screwings 17, and one or more self-lubricating bushings 6 or roll-on linear bushings.

The invention also includes a slide 7 of variable dimensions according to the available spaces and the number of locking points, with translating or rotating movement, the slide 7 defining the screwings 17. The invention also has a motor-pin 8, provided with a threading for threading into the slide 7 and with a smooth part for rotating in the self-lubricating bushing 10. The effective diameter of the device can be reduced by means of key 9 coupled with the motor-gear 11, fixed onto the end of said pin 8. Lastly, the invention includes the self-lubricating bushing 10, of circular, square or polygonal shape, for locking and avoiding the sliding of the flange 1.

Due to the small available space, in a preferred embodiment of the device according to the present invention the following elements are thus provided:

(1) a whole worked cylinder with a seat for the slide, the flanges and the half-bands;

(2) worked bands or externally smooth bands; and (3) a slot locking system fixed under the band.

The slot locking system may include an indirectly worked slide providing the slot for the system, fixed under the band, but more preferably includes a worked slide sliding in a linear guide, or linear bushes or bushings, that is fixed in a suitable seat in a central area or provided with two terminal linear bushings, with a translation movement of a variable run, or with a movement rotating on its own axis, such that the slide is locked by means of its own shape, like a cam or with a cam system. Still more preferably, the locking system is formed of a slide that is pushed by a micro-cylinder with a single or double effect, or by a mechanic actuation with a smooth or threaded pin. With this arrangement, the passage of air for actuating the micro-piston starts in the external surface of the lateral flange, and crosses a micro-joint, and continues to the micro-piston by way of a small pipe of different material, or by a way of a sealed groove out of the same materials. In a further variant according to this embodiment of the present invention, a fixed ring may be provided around the flange, in which the air connection is present.

With the variation of the dimensions of the "raviolis"—like those with fresh cheese and spinach—the diameter of the device may be increased by increasing the circumference of the bands and interposition of thicknesses and prolongation of the pin provided under said bands, to thereby allow a rigid and precise complete locking.

As noted above, the actuating push of slide 7 may be generated by a pneumatic system, with a single or double effect, or it may be of the closed circuit kind with a sliding piston. In a further variant, said push may also be determined by a mechanic actuation with a smooth or threaded pin, working directly in the section of the slide or placed below the same, while the rotating movement is generated by gears.

I claim:

1. A device for the relief impression onto food pastes comprising:
    a cylinder;
    a first flange positioned at a first side of the cylinder,
    a second flange positioned at a second side of the cylinder opposite the first side, the second flange defining at least one seat;
    a first bushing positioned in the at least one seat;
    a second bushing fixed to the cylinder;
    a slide positioned between the flanges and slidably mounted in the second bushing, such that the slide is slidable between a first position and a second position, the slide defining therein at least one slot and a threaded recess;
    a threaded pin passing through the first bushing and removably engaged with the threaded recess of the slide, such that, when the threaded pin is turned in a first direction, the slide slides to the first position, and when the threaded pin is turned in a second direction opposite the first direction, the slide slides to the second position;
    a half-band having an impression formed thereon; and
    at least one under-band pin having an upper part attached to the half-band and a lower part engaged with the at least one slot defined in the slide, such that,
        when the slide slides in the first direction, the half-band is moved away from the slide to an unlocked position, whereby the half-band may be removed from the cylinder, and
        when the slide slides to the second position, the half-band is pulled toward the slide to a locked position, whereby the slide is fixed to the cylinder between the flanges; and
    a small carter for protecting the slide against dust, the carter defining a plurality of eyelets for the passage of the under-band pins during movement of the half-band between the locked position and the unlocked position.

2. A device according to claim 1, the second flange includes at least one locking point for locking a position of the threaded pin.

3. A device according to claim 1, wherein a circumference of the cylinder is variable by varying a circumference of the half band and varying a length of the at least one under-band pin.

* * * * *